United States Patent [19]

Niwa

[11] Patent Number: 5,144,871
[45] Date of Patent: Sep. 8, 1992

[54] NUMERICALLY CONTROLLED SCREW CUTTING METHOD FOR FINE SCREW SURFACE FINISHING

[75] Inventor: Tomomitsu Niwa, Aichi, Japan

[73] Assignee: Mitsubishi Denki K.K., Tokyo, Japan

[21] Appl. No.: 584,015

[22] Filed: Sep. 18, 1990

[30] Foreign Application Priority Data

Dec. 8, 1989 [JP] Japan .................. 1-317750

[51] Int. Cl.$^5$ ............ B23B 1/00; B23C 3/32
[52] U.S. Cl. .................. 82/1.11; 82/118;
  82/110; 364/474.18; 364/474.33; 409/66
[58] Field of Search ......... 364/474.18, 474.33;
  82/110, 1.11, 118; 409/65, 66, 69, 78; 10/101 R,
  102; 51/287, 288

[56] References Cited

U.S. PATENT DOCUMENTS

| | | | |
|---|---|---|---|
| 3,854,353 | 12/1974 | Cutler | 82/110 X |
| 4,096,770 | 6/1978 | Tanner | 82/110 X |
| 4,173,786 | 11/1979 | Kuhnell et al. | 364/474.33 |
| 4,580,225 | 4/1986 | Thompson | 82/110 X |

FOREIGN PATENT DOCUMENTS

| | | | |
|---|---|---|---|
| 59-39250 | 9/1984 | Japan . | |
| 2228019 | 11/1985 | Japan . | |
| 60-175103 | 1/1986 | Japan . | |
| 0040208 | 2/1989 | Japan | 409/66 |
| 0490586 | 11/1975 | U.S.S.R. | 82/110 |

*Primary Examiner*—Larry I. Schwartz
*Assistant Examiner*—Julie R. Daulton
*Attorney, Agent, or Firm*—Sughrue, Mion, Zinn Macpeak & Seas

[57] ABSTRACT

A screw cutting method for use with a numerically controlled machining system is improved by enabling finer finishing of the final screw surface. The invention allows the removal of scars formed during rough machining by offsetting the position of the rough machining passes in the direction of screw cutting, i.e., in the direction of movement of the tool during cutting, so that during the final finishing pass, more material is removed from the screw surface opposing the cutting direction. Surface finish is further improved by specifically controlling the cutting depth in the cutting passes just preceeding the final cutting pass.

11 Claims, 5 Drawing Sheets

CUTTING DIRECTION (FIG.3b)

CUTTING DIRECTION $\beta = 0$ $\beta = 100$ $\beta = -100$

NUMERICALLY CONTROLLED SCREW CUTTING METHOD FOR FINE SCREW SURFACE FINISHING

BACKGROUND OF THE INVENTION

The present invention is generally directed to screw cutting methods, and, more particularly, to a screw cutting method capable of finely finishing the screw face. Numerically controlled machine tools frequently include the capability of cutting a screw surface by simply entering certain parameters and instructing a screw cutting cycle. In known screw cutting processes, parameters such as the finished configuration including the thread height and the amount (e.g. depth) of cutting in the first pass are instructed, and the tool route is automatically determined. In the screw cutting cycle, the workpiece is formed with a screw surface assuming the instructed shape by repeating screw cutting processes in successive passes while varying the cutting quantity (depth) little by little. The cutting quantity in each screw cutting process and the tool route are automatically determined, whereby the screw is formed into the instructed shape. FIG. 1 is an explanatory diagram illustrating one technique of cutting a taper screw. The numeral 1 represents the workpiece; and 2 designates the cutting tool. The workpiece 1 is rotated at a predetermined rotational speed during the screw cutting process.

A machining instruction which will initiate the screw cutting operation is prepared as follows:

$$G76X...Z...I...K...D...F...A...*; \qquad (1)$$

where G76 is the (EIA standard) preparatory function command (screw cutting), X and Z are the coordinate values at a point D, I is the radius value of the screw portion, indicative of the taper, wherein straight screw cutting is set when I=0, K is the thread height (a distance along the X-axis direction is specified), D is the amount (depth) of cut on the first pass, F is the screw lead (the amount of movement of the cutting tool in the Z-axis direction per o revolution of the workpiece), and A is the angle of the cutting edge (the thread angle). In the first screw cutting pass of the screw cutting cycle, the cutting tool 2 is moved along the path S→S$_1$→B$_1$→D$_1$→E→S in FIG. 1. Between B$_1$ and D$_1$, the cutting tool 2 is advanced at a feed speed based on the screw lead factor F, and screw cutting is performed with the cutting depth D. Between D$_1$ and E and between E and S, the cutting tool 2 is fast fed and then returns to the start point of screw cutting at a high velocity.

In more detail, the cutting operation commences by first moving the tool to point S$_1$ from point S. Note that the length of the line segment S-S$_1$ is equal to the length of the line segment B-B$_1$, and hence the incremental positional change here ($\Delta$Z, $\Delta$X) can be expressed as (D*tanA/2, D), where D is the depth of cut (see FIG. 2). The cutting tool can be moved to the point S$_1$ by distributing the X, Z driving pulses on the basis of the foregoing incremental quantities. After moving in the X-axis direction by a distance given by {Xs−(X−I+K)}, where (X−I+K) is the coordinate value at the point B, the point of the cutting tool 2 reaches the point B$_1$. Thereafter, when the cutting tool is fed along rectilinear line B$_1$−D$_1$' with the feed speed in the Z-axis direction equal to F, the screw cutting process is carried out with a cutting depth D and a lead F. Note that the inclination of the rectilinear line B$_1$−D$_1$' is defined by I/(Zs−Z). Hence, biaxial drive-pulse distribution is effected so that the cutting tool moves in the X-axis direction by a total distance equal to the radius value I, and also makes a (Zs−Z) movement in the Z-axis direction. As a result, the cutting tool 2 is moved along the rectilinear line B$_1$−D$_1$'. When reaching the point D$_1$', the cutting tool is then moved more quickly to the point D$_1$. Whether the cutting tool has reached the point D$_1$' is detected in the following manner. The numerical control unit includes a register for storing the Z-axis component (Zs−Z) between S and D$_1$ when initiating the screw cutting process and performs addition or subtraction depending on the moving direction when the cutting edge moves in the Z-axis direction. It can therefore be considered that the cutting tool 2 reaches the point D$_1$, when a monitored content of the register is equalized to $\gamma$ which is separately given as a parameter. When the content of the memory becomes zero, the cutting tool 2 reaches the point D$_1$. Subsequently, the cutting tool is fast-fed through the point E and returns to the point S at high speed. Thereafter, the second screw cutting pass S→S$_2$→B$_2$→D$_2$→E→S and the third pass S→S$_3$→B$_3$→D$_3$→E→S ... are carried out while varying the cutting depth. Finally, after the screw cutting process is performed on condition that $\alpha$ (separately given as a lo parameter, see FIG. 2) is set as the final cutting depth, a screw assuming the instructed configuration is formed in the workpiece 1.

The method of calculating the n-th cutting depth Dn in the foregoing screw cutting cycle may vary. One example will hereinafter be described. Let D be the cutting quantity in the first pass. The cutting quantity for subsequent passes is then determined as follows:

$$Dn = (\sqrt{n} - \sqrt{n-1}) \qquad (2)$$

When the cutting quantity Dn is determined on the basis of formula (2), the workpiece cutting quantity (volume) can be kept constant from pass to pass for a straight screw. The cutting quantity can also be kept substantially constant in a tapered screw using this scheme, so that the load on the tool 2 stays substantially the same over the course of the entire cutting operation. Note that the n-th (n=1, 2, 3 ... ) cutting area (the portion between oblique lines in FIG. 2) becomes $D^2 \tan A/2$, and is kept constant.

Where cutting is performed according to the above-described method, however, there arises a problem in that, as illustrated in FIG. 3, the thread face (marked "A") opposed to the cutting direction, i.e. the moving direction of the tool, is not finely finished due to influences exerted by the deflection of the cutting tool during its movement. The reason for this is that the value of the final cutting quantity $\alpha$ (the finishing allowance) is not so large, and hence scars formed on the thread face A during the prior cutting passes are not completely eliminated by the finishing pass. These scars are created largely due to the deflection of the tool during the previous passes, due to the load on the tool.

SUMMARY OF THE INVENTION

Accordingly, it is a primary object of the present invention to provide a novel screw cutting method, by which the thread face A can be finely finished, and which does not require an excessive number of cutting passes.

The screw cutting method according to the present invention is arranged such that the amount of material removed during the final screw cutting pass can be shifted such that it is greater on the thread face A than on the opposite thread face B by an arbitrary amount. According to a further aspect of the invention, screw cutting in the passes just preceeding the final pass are also closely controlled, to minimize the total number of passes.

In general, the final screw cutting pass has been performed with the same quantity of material removed from both faces A and B. In contrast, according to the invention, the volume of material removed from face A increases with a shift of the previous passes towards face B, thereby allowing the elimination of scars formed on face A during previous cutting operations.

DESCRIPTION OF THE PREFERRED EMBODIMENTS

The screw cutting method according to the present invention will hereinafter be described in detail with reference to the accompanying drawings.

Figure 2:
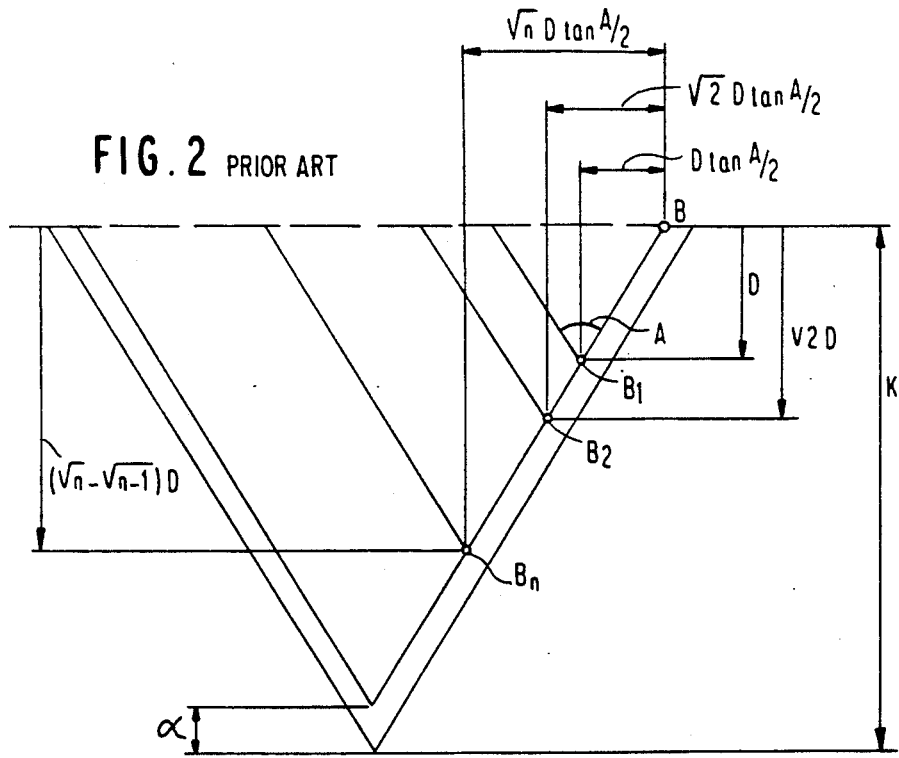
FIG. 2 is an explanatory diagram showing a method of determining the cutting depth during screw cutting.
Figure 3A:
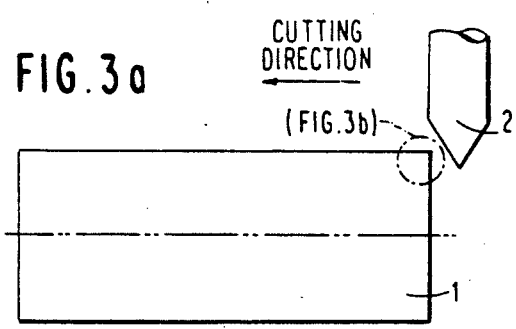
FIG. 3 is an explanatory diagram showing defects inherent in a conventional cutting method.
Figure 3B:
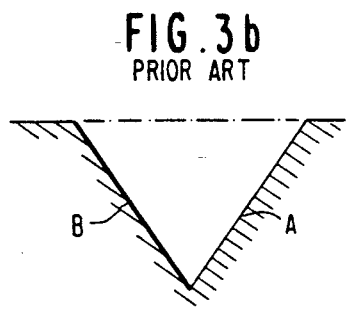
Figure 4:
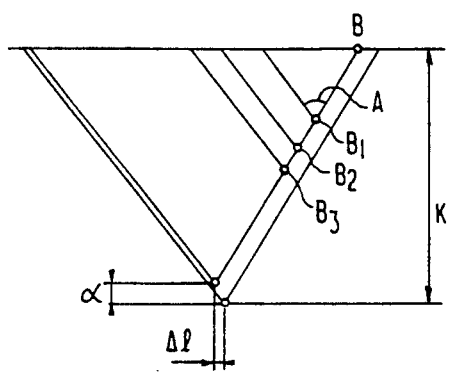
FIGS. 4 and 5 are explanatory diagrams in combination illustrating a cutting method according to the present invention.

FIG. 4 is a diagram explaining the screw cutting method of the invention. The same components as in FIG. 2 are marked with like symbols.

Figure 5:
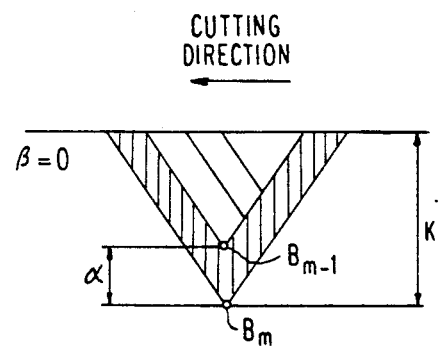
Figure 5:
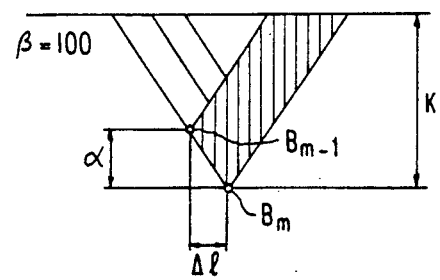
Figure 5:
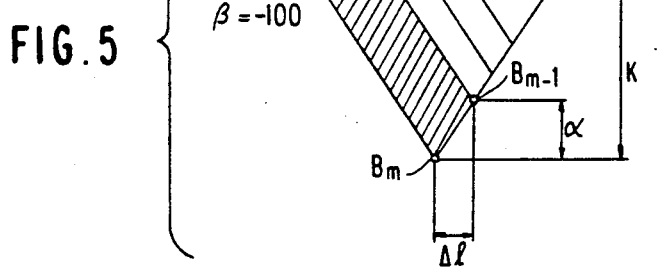

The final cutting quantity or finishing allowance $\alpha$ and a shift coefficient $\beta$ are set in advance in accordance with cutting conditions such as the feed speed, peripheral speed and the materials of the workpiece and the cutting tool. The rough machining passes of the screw cutting process are shifted in the direction of the Z-axis by a shift quantity ($\Delta 1$) calculated (as shown below) from the shift coefficient $\beta$, and the thread cutting volume is varied only in the final (finishing) machining pass. FIG. 5 shows how the shift varies with $\beta$, wherein the hatched area represents in each case the portion to be cut in the final cutting pass, when $\beta = 0$, $\beta = 100$ and $\beta = -100$. When $\beta = 0$, there is no shift, and the same cutting method as in the conventional case is adopted. When $\beta = 100$, only the face (face "A") opposite to the cutting direction is cut in the final pass. When $\beta = -100$, only the face (face "B") disposed in the cutting direction is cut.

If the value of $\beta$ is set above zero, the volume of material cut from the face opposite the cutting direction is greater than that cut from the face disposed in the cutting direction in the final cutting pass, with the result that the screw face can be finely finished. It is been found that good results are obtained particularly when $\beta$ is set to around 30.

Figure 1:
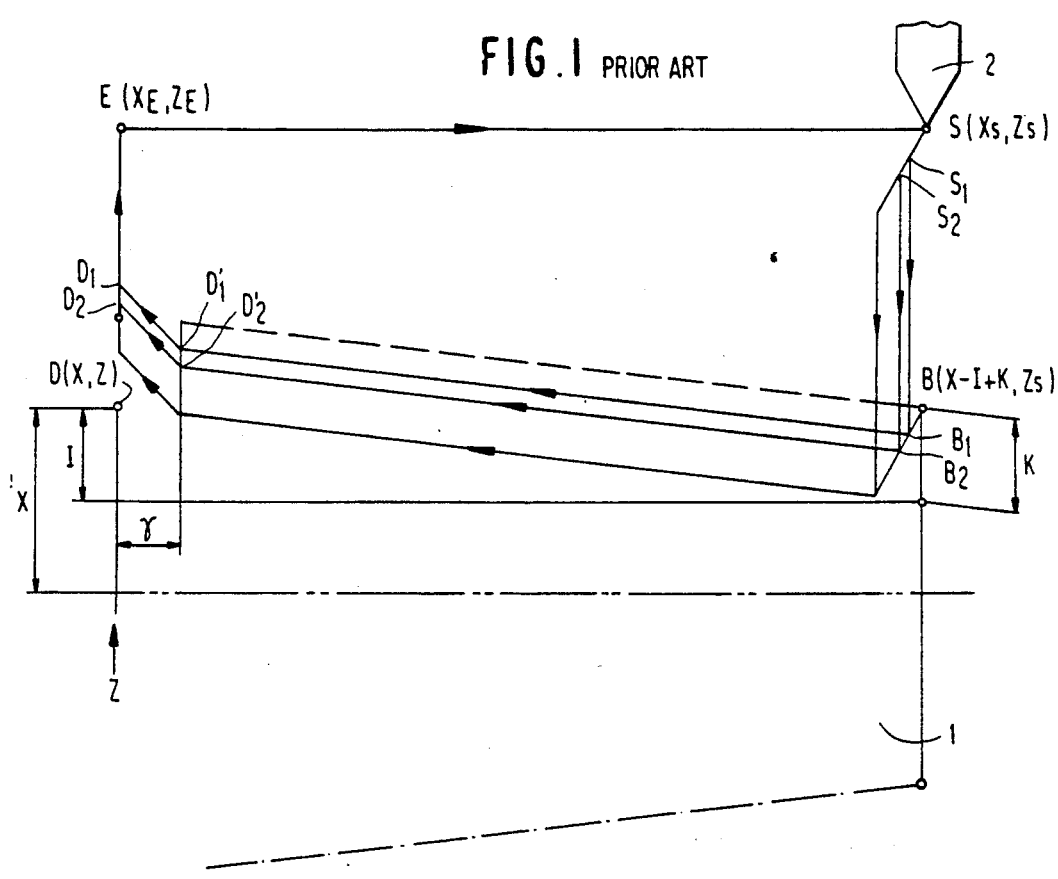
FIG. 1 is an explanatory diagram showing a screw cutting operation.
Figure 6:
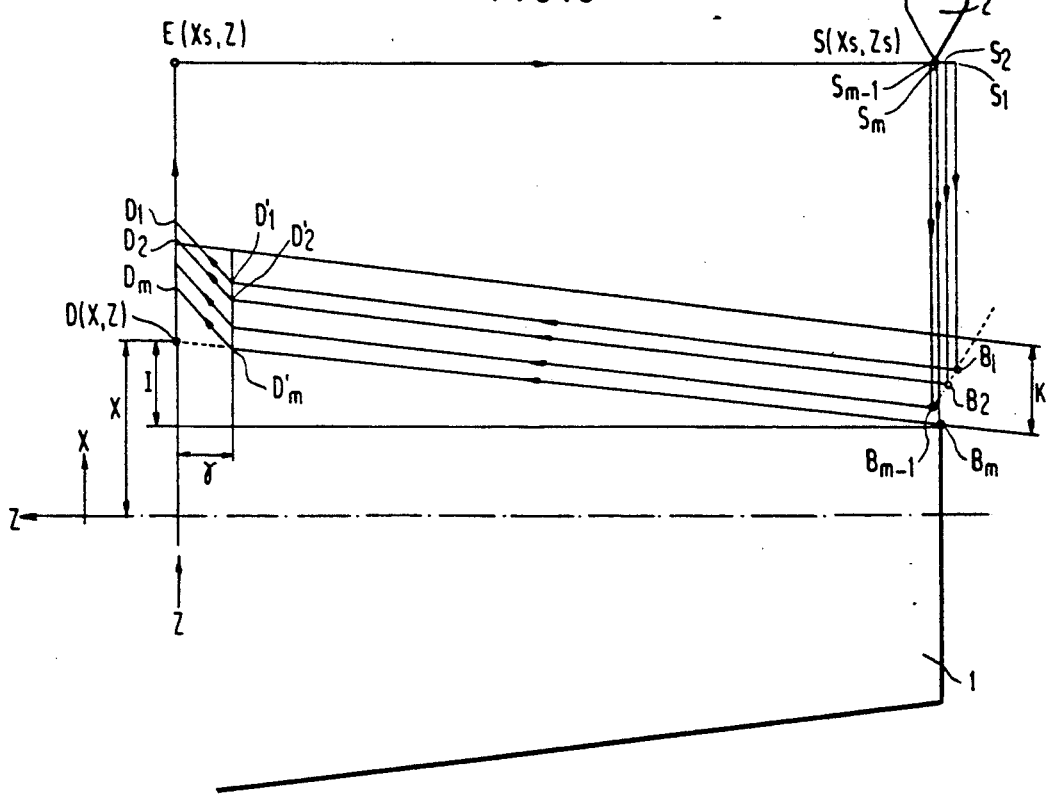
FIG. 6 is an explanatory diagram illustrating one embodiment of the screw cutting technique according to the present invention.

Turning to FIG. 6, there is illustrated a detailed example of a cutting path associated with the screw cutting method of the invention. The same components as in FIG. 1 are marked with like symbols.

Figure 7:
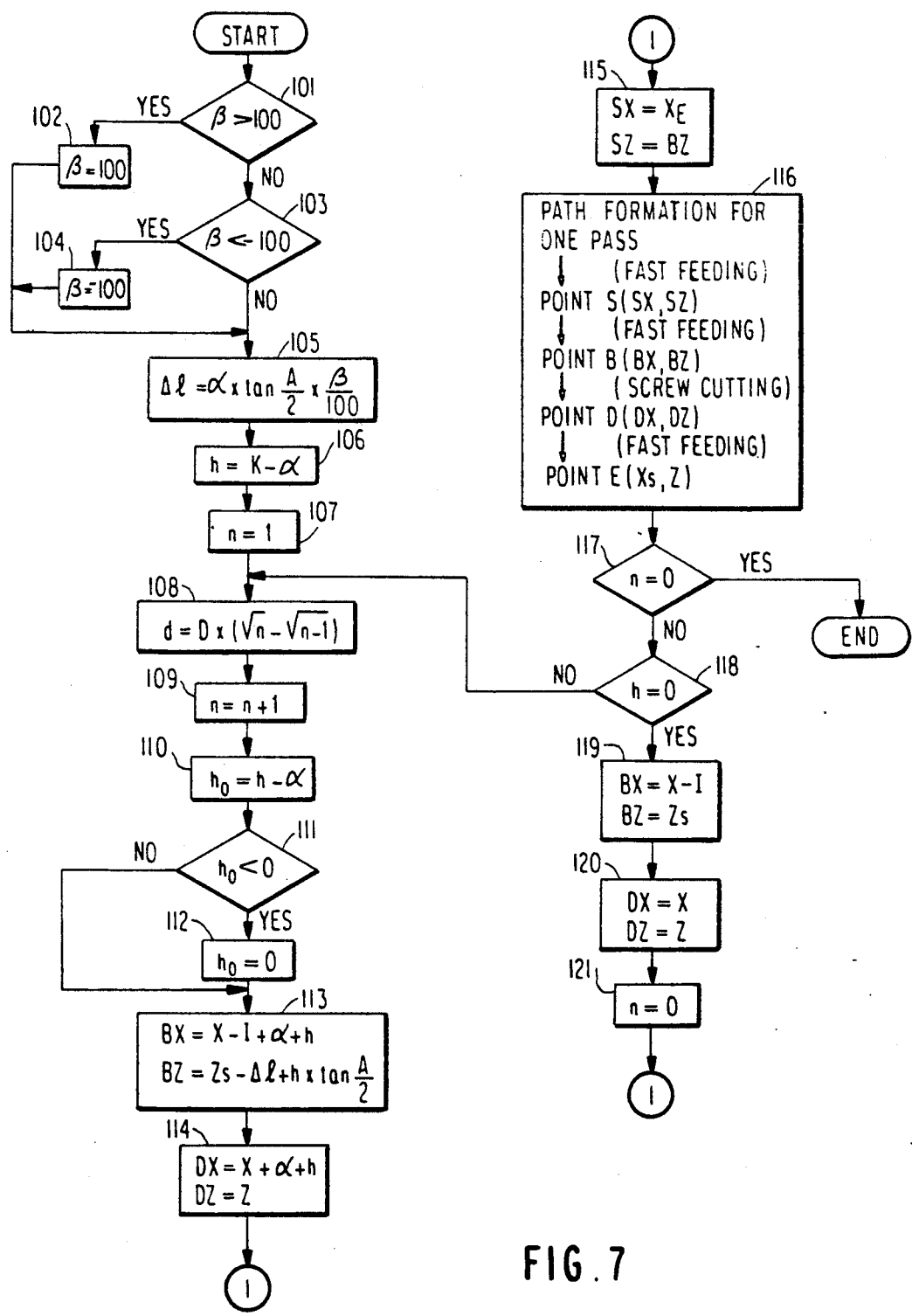
FIG. 7 is a flow chart of assistance in explaining the processing method according to the present invention.

The following initial parameters are input from a manual data input source or the like:
 $\alpha$: final cutting depth or quantity
 $\beta$: final cutting shift coefficient
In addition, the following data are provided in the screw formation program instructions:
 X: X-axis coordinate value at the screw terminus
 Z: Z-axis coordinate value at the screw terminus
 I: incremental value in the X-axis direction when viewed from the terminus, indicative of the screw taper
 K: thread height
 D: initial cutting quantity or depth
 F: the screw lead
 A: the thread angle
 Xs: the relief angle
 Zs: Z-axis coordinate value at the start point of the screw cutting operation FIG. 7 is a flow chart showing one example of the operation of the present invention. In steps 101-104, the range of the shift coefficient $\beta$ is checked. The task in step 101 is to judge whether the value of $\beta$ is greater than 100 or not. If so, clamping is effected in step 102 on the condition that $\beta = 100$. The task in step 103 is to make a judgement as to whether the value of $\beta$ is smaller than $-100$. If so, clamping is performed in step 104 on the condition that $\beta = -100$. In the subsequent step 105, the shift amount of the rough machining passes is calculated from the following formula:

$$\Delta 1 = \alpha \cdot \tan\frac{A}{2} \cdot \frac{\beta}{100} \quad (3)$$

$\Delta 1$ obtained from formula (3) is the shift amount in the Z-axis direction during the rough machining passes (see FIG. 4). When $\beta = 0$, a relation of $\Delta 1 = 0$ is established, and the same results as in the conventional cutting method are obtained.

In step 106, the height of the thread to be cut during rough machining is arithmetically given by:

$$h = K - \alpha \quad (4)$$

This value is obtained by subtracting the final cutting quantity ($\alpha$) from the entire thread height (K).

In step 107, a value of a register (n) for counting the number of screw cutting processes is initialized to 1.

In step 108, the screw cutting quantity (d) at the time is calculated by the following formula:

$$d = D \cdot (\sqrt{n} - \sqrt{n-1}) \quad (5)$$

According to formula (5), there is obtained the cutting quantity (depth) in the case of cutting the screw in the constant area mode (i.e., where the quantity of material removed remains constant). The counter for counting the number of screw cutting passes is upped in step 109. In step 110, the remaining thread height (h) to be cut during rough machining is obtained by subtracting the cutting quantity (d) of the cutting process at the time (calculated in step 108) from the height (previous value of h) of the screw which is to be subjected to rough machining (see FIG. 2). In step 111, the remaining thread height (h) calculated in step 110 is checked. If negative, in step 112 the remaining thread height is set at h=0.

In step 113, coordinate values (BX, BZ) at the current start point of screw cutting are arithmetically given by:

$$BX = X - I + \alpha + h$$

$$BZ = Z_s - \Delta 1 + h \cdot \tan A/2 \qquad (6)$$

Figure 8:
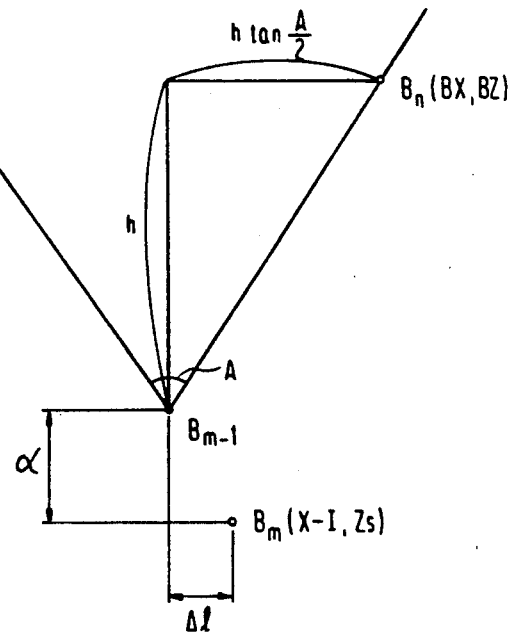
FIG. 8 is an explanatory diagram showing one manner of calculating a screw cutting start point according to the present invention.

FIG. 8 is a diagram explaining formula (6).

In step 114, coordinate values (DX, DZ) at the end point of screw cutting for the given pass are calculated as follows:

$$DX = X + \alpha + h$$

$$DZ = Z \qquad (7)$$

In step 115, screw cutting approach positions (SX, SZ) are set as indicated.

In step 116, based on the thus calculated coordinate values (BX, BZ), (DX, DZ) and (SX, SZ), a screw machining path for one pass is formed. The operation starts with the formation of a path for fast traversal to the approach point S (SX, SZ). Next, there is created a path for fast movement to the calculated screw cutting start point B (BX, BZ). A path for permitting screw cutting up to a screw cutting end point D (DX, DZ) is formed. (The tool may begin its retreat at an earlier point ($D_1'$, $D_2'$, etc.) as in FIG. 1, if desired) Finally, a path for fast movement to an escape point E (Xs, Z) is created.

An end judgement is made in step 117. If n=0, the screw cutting cycle is terminated.

In step 118, it is determined whether rough machining has been completed. When h=0, step 119 and subsequent steps are executed preparatory to the final finishing process. If the height h is non-zero, operations are repeated from step 108.

In step 119, start point coordinate values (BX, BZ) for final screw cutting are set as follows:

$$BX = X - I$$

$$BZ = Zs$$

This point is represented by Bm in FIGS. 6 and 8. Note that point Bm is shifted in the Z direction by $\Delta 1$ from the previous start point Bm-1, which was the start point for the final rough machining pass.

End point coordinate values (DX, DZ) for final screw cutting are set in step 120. The end point coordinates are (X, Z). In step 121, n is set to zero so that machining termination will be determined in the subsequent operation of step 117. The final machining pass operations proceed from step 115.

The above embodiment has been described with reference to a machining method where the cutting quantity stays the same, i.e., the so called constant area mode. In this method, cutting in the rough machining process is invariably performed using primarily one cutting edge of the cutting tool. The calculation of the cutting quantities and the actual cutting technique may, however, involve the use of other methods, such as will be described below. In any case, however, it is possible to finely finish the screw cutting face by performing finish machining from a position which is shifted by a distance specified by a coefficient $\beta$ from the portion cut during rough machining.

As mentioned, the rough machining-shift technique described above may be used regardless of the particular cutting technique involved. The illustrative example was directed to a technique where the amount of material removed on a given pass was held constant or substantially so. This technique has the advantage of insuring a substantially constant load on the tool, but has the disadvantage that only one surface of the cutting tool is employed for the most part, i.e., the leftward surface in the figures. This can result in premature wearing out of the tool. There is also another disadvantage in that as the surface area engaged by the tool increases, as it does in successive passes, the depth of cutting decreases substantially so as to keep the removal amount constant. This can result in an excessive number of machining passes being employed, increasing the production time for each workpiece.

Figure 9:
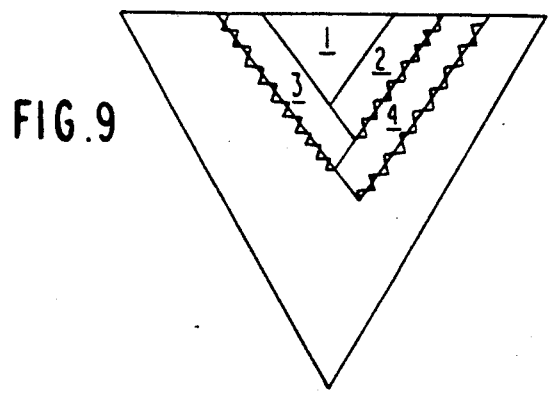
FIG. 9 illustrates one alternative cutting technique.

To ameliorate the first disadvantage, a cutting technique can be used wherein cutting essentially proceeds in a "herringbone" pattern, using the cutting surfaces of the tool alternatingly. An example of this pattern is shown in FIG. 9, where the small numerals indicate the successive cutting passes. The manner of implementing this cutting technique will be readily apparent, and need not be discussed at length here.

Figure 10:
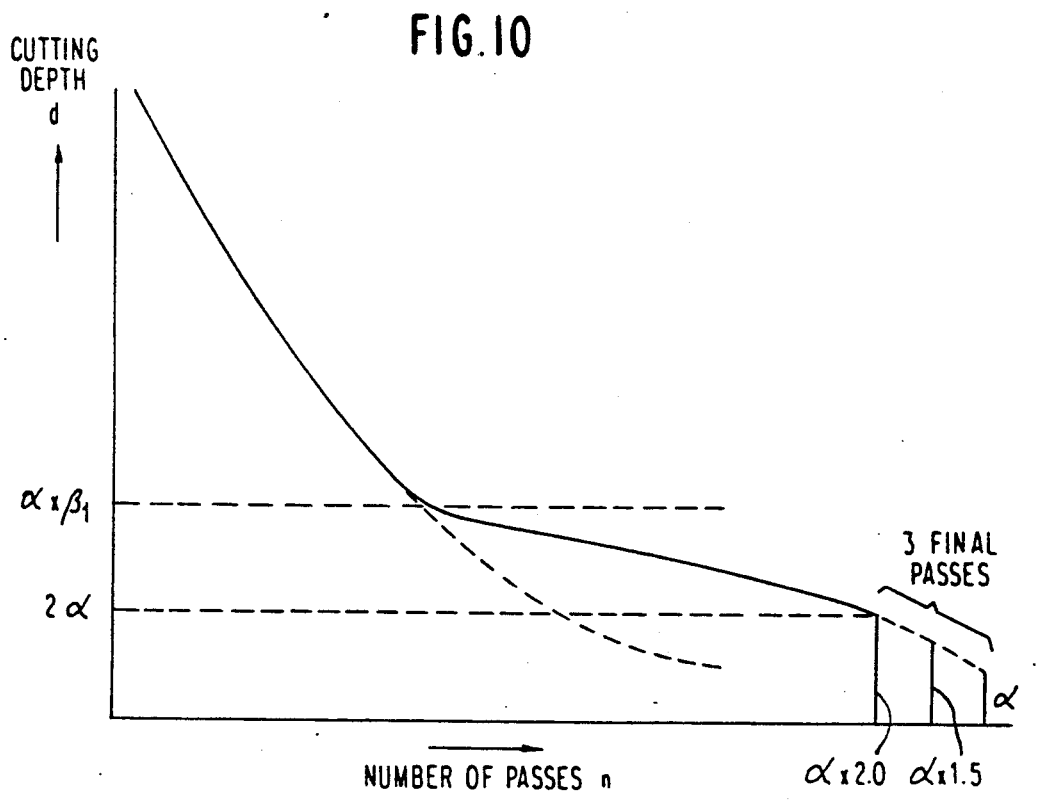
FIG. 10 illustrates a cutting technique which results in a minimum number of cutting passes and smooth completion of the final few passes.

As to the second disadvantage, there are a number of options available to decrease the number of passes and thus increase the throughput of the machine. As a first example, the constant removal technique can be used up to a point, i.e., until the depth of cutting decreases to a so called clamp value, after which the depth of cut in subsequent passes will be held constant until the final pass or the pass just before the final pass. Since the last few passes are most important from the standpoint of obtaining a finely finished surface, a somewhat more complicated scheme may be employed as shown in FIG. 10. In this arrangement, there are three distinct cutting techniques employed depending on how far along the cutting cycle has proceeded. The last stage of cutting is finely controlled, such that the cutting depth or amount $\alpha$ is established as the final finishing allowance. Also, in the two passes prior to the final pass, the cutting depth is also predetermined; for example, the values 1.5 $\alpha$ and 2.0 $\alpha$ can be used for these two passes. This prevents the depths of cut before the final finishing pass from being too large and causing scars to be formed which will remain after the finishing pass. At the beginning stage of cutting, the cutting depth is varied along the curve defining constant workpiece removal. In the intermediate cutting stage, the curve is flattened and made substantially linear beginning at a point described by $\alpha * \beta_1$, where $B_1$ is greater than 2 and is user defined.

In the above embodiments, there has been described a mode in which the path for final finishing machining is fixed, whereas the path for rough machining is shifted. However, it will be appreciated that the path for final finishing machining can shifted, with the rough machining pattern being fixed.

As described above, in accordance with the present invention, a screw cutting face can be finely finished, and without requiring additional costly machining hardware. The device can therefore be actualized at no greater cost than the prior art machine.

What is claimed is:

1. A method of forming a screw surface in a workpiece subjected to numerically controlled machining, comprising:

inputting screw cutting parameters to define the configuration of said screw surface;

employing said cutting parameters to determine a path for a cutting tool, said path including plural cutting passes along said workpiece in a cutting direction;

with respect to the desired final configuration of said screw surface, cutting said workpiece according to said path, wherein each said cutting pass save a final cutting pass is offset in said cutting direction; and cutting said final cutting pass into said workpiece according to said path without an offset.

2. A method as claimed in claim 1, wherein an amount of said offset is determined by one of said screw cutting parameters.

3. A method as claimed in claim 1, wherein said offsetting is performed such that an amount of said offset is set such that, in said final cutting pass, the majority of the material removed from said workpiece is removed from the side of the screw surface opposite said cutting direction.

4. A method as claimed in claim 1, wherein said step of determining said path includes the step of setting a cutting depth or amount for each of said cutting passes.

5. A method as claimed in claim 4, wherein said cutting depth varies for each of said passes in a manner so as to render substantially constant the amount of material removed from the workpiece in a given pass.

6. A method as claimed in claim 4, wherein said screw cutting parameters include a final cutting depth or allowance value, and wherein the cutting depth in at least that pass prior to the final pass is controlled to be a set multiple of said final cutting depth or allowance value.

7. A method as claimed in claim. 4, wherein said cutting depth varies for each of said passes in a manner so as to render substantially constant the amount of material removed from the workpiece in a given pass, over a first number of cutting passes, and wherein said screw cutting parameters include a final cutting depth or allowance value, and wherein the cutting depth in at least that pass prior to the final pass is controlled to be a set multiple of said final cutting depth or allowance value.

8. A method as claimed in claim 4, wherein the surface of said tool used to cut said screw face in each of said passes alternates as between adjacent passes.

9. A method of forming a screw surface in a workpiece subjected to numerically controlled machining, comprising:

inputting screw cutting parameters to define the configuration of said screw surface, said parameters including at least one parameter relating to the depth of cutting in a final cutting pass;

employing said cutting parameters to determine a path for a cutting tool, said determined path including plural cutting passes along said workpiece in a cutting direction;

said plural cutting passes comprising a first set of cutting passes and a second set of cutting passes;

said first set of cutting passes having the cutting depth set such that the amount of workpiece material removed during each pass is substantially constant;

said second set of cutting passes having the cutting depth set such that the cutting depth of each successive pass is a decreasing multiple of said final cutting depth; and cutting said workpiece according to said determined path.

10. A method as claimed in claim 9, further including the step of setting the cutting depth in a third set of cutting passes, intermediate said first and second sets of cutting passes, such that the depth of cutting varies of least substantially linearly with increasing numbers of passes.

11. A method as claimed in claim 9, further including the step of offsetting, with respect to the desired final configuration of said screw surface, said plural cutting passes, except for the final cutting pass, in said cutting direction.

* * * * *